(12) United States Patent
Zinn et al.

(10) Patent No.: US 8,167,189 B2
(45) Date of Patent: May 1, 2012

(54) METHODS FOR REWORK OF A SOLDER

(75) Inventors: Alfred A. Zinn, Palo Alto, CA (US); Charles Packer, Emerald Hills, CA (US); Frances Chiu, Sunnyvale, CA (US); Earl Montgomery, Monte Sereno, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/073,952

(22) Filed: Mar. 28, 2011

(65) Prior Publication Data
US 2011/0240716 A1 Oct. 6, 2011

Related U.S. Application Data

(60) Provisional application No. 61/318,925, filed on Mar. 30, 2010.

(51) Int. Cl.
*B23K 1/018* (2006.01)
*B23K 31/02* (2006.01)

(52) U.S. Cl. ............... 228/119; 228/191; 228/264

(58) Field of Classification Search ............... None
See application file for complete search history.

(56) References Cited

U.S. PATENT DOCUMENTS

| | | | | |
|---|---|---|---|---|
| 2,840,467 | A | | 6/1958 | Atherton et al. |
| 3,958,984 | A | * | 5/1976 | Fountain .................... 423/29 |
| 3,990,982 | A | * | 11/1976 | Dixon ...................... 252/79.3 |
| 4,274,908 | A | * | 6/1981 | Fishter et al. ............... 216/90 |
| 4,302,246 | A | * | 11/1981 | Brindisi et al. ............. 75/715 |
| 4,324,626 | A | * | 4/1982 | McGivern, Jr. ........... 205/720 |
| 4,412,641 | A | * | 11/1983 | Fuchs et al. ................. 228/37 |
| 4,746,050 | A | * | 5/1988 | Brown ........................ 228/57 |
| 5,072,874 | A | * | 12/1991 | Bertram et al. ............ 228/264 |
| 5,139,883 | A | | 8/1992 | Raykhtsaum et al. |
| 5,284,286 | A | * | 2/1994 | Brofman et al. ............ 228/19 |
| 5,305,941 | A | * | 4/1994 | Kent et al. ................... 228/19 |
| 5,378,290 | A | * | 1/1995 | Tazi et al. ................... 148/23 |
| 5,399,187 | A | | 3/1995 | Mravic et al. |
| 5,439,637 | A | * | 8/1995 | Moyer ....................... 419/26 |
| 5,565,643 | A | | 10/1996 | Raines et al. |
| 5,871,139 | A | * | 2/1999 | Moyer ....................... 228/264 |
| 5,964,963 | A | * | 10/1999 | Turchan et al. ............ 148/22 |
| 6,344,234 | B1 | * | 2/2002 | Dalal et al. ............... 427/96.8 |
| 6,784,087 | B2 | * | 8/2004 | Lee et al. .................. 438/612 |
| 7,303,112 | B2 | * | 12/2007 | Ivory et al. ................ 228/119 |

(Continued)

OTHER PUBLICATIONS

Zou, H.F. et al, "Eliminating interfacial segregation and embrittlement of bismuth in SnBi/Cu joint by alloying Cu substrate", Scripta Materialia, 2009, 308-311, vol. 61.

(Continued)

*Primary Examiner* — Kiley Stoner
(74) *Attorney, Agent, or Firm* — McDermott Will & Emery LLP

(57) ABSTRACT

Methods for reworking a solder containing one or more joined members are described herein. Such methods can include applying a disintegrating agent to a solder containing a solder material, disintegrating the solder material to form a disintegrated solder material, and removing the disintegrated solder material from the solder. Such methods can also include applying a disintegrating agent containing bismuth to a solder containing a solder material, and heating the solder to liquefy the disintegrating agent. Such methods can also include applying a disintegrating agent containing a bismuth alloy to a solder having a solder material that contains metal nanoparticles, and heating the solder to liquefy the bismuth alloy.

32 Claims, 2 Drawing Sheets

U.S. PATENT DOCUMENTS

| | | |
|---|---|---|
| 2005/0039827 A1 | 2/2005 | Yamagishi et al. |
| 2005/0109820 A1* | 5/2005 | Milewski et al. ........ 228/180.22 |
| 2005/0115452 A1 | 6/2005 | Johansson |
| 2005/0274227 A1 | 12/2005 | Aggarwal et al. |
| 2006/0278992 A1 | 12/2006 | Trezza et al. |
| 2007/0172381 A1 | 7/2007 | Deram |
| 2008/0083819 A1* | 4/2008 | Hsu et al. ...................... 228/119 |
| 2010/0065616 A1 | 3/2010 | Zinn |

OTHER PUBLICATIONS

Sengupta, S. et al, "Microstructure and properties of a bismuth-indium-tin eutectic alloy", Journal of Materials Science, 2002, 1747-1758, vol. 37.

International Search Report and Written Opinion of the International Searching Authority, PCT/US2011/30223, May 25, 2011.

* cited by examiner

METHODS FOR REWORK OF A SOLDER

CROSS-REFERENCE TO RELATED APPLICATIONS

This application claims the benefit of priority under 35 U.S.C. §119 from U.S. Provisional Patent Application Ser. No. 61/318,925, filed Mar. 30, 2010, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to solders, and, more particularly, to rework of solders.

BACKGROUND

Although lead has been traditionally used in numerous industrial applications, current regulations have mandated the phase out of lead in most commercial products. For example, the European Union issued regulations in 2006 that mandated the elimination of lead from coatings and solders used in most electronic components. Other countries have issued similar mandates.

Soldering applications, particularly in electronics and vehicle manufacturing, have been heavily impacted by the ban on lead. Although many alternatives to traditional lead-based solders have been developed, the Sn/Ag/Cu (SAC) system being among the most widely used, such replacements have typically exhibited several drawbacks compared to traditional Sn/Pb solder. As a non-limiting example, the SAC system has a significantly higher eutectic melting point (e.g., m.p. of ~217° C.) than does traditional Sn/Pb solder (m.p. of 183° C. for 63/37 Sn/Pb or 188° C. for 60/40 Sn/Pb). Thus, use of the SAC system is limited to materials that are capable of withstanding its higher processing temperature. Further, rework of a solder to replace failed components typically becomes more difficult at the higher processing temperatures of many lead-free solder replacements.

Several compositions containing metal nanoparticles have also been proposed as replacements for traditional lead-based solders. Metal nanoparticles can exhibit physical and chemical properties that sometimes differ significantly from those observed in the bulk material. For example, copper nanoparticles having sizes of less than about 20 nm can exhibit a fusion temperature that is significantly below the melting point of bulk copper (e.g., less than about 200° C. for copper nanoparticles compared to 1083° C. for bulk copper). For this reason and others, metal nanoparticle systems, including copper nanoparticle systems, have been pursued as replacements for lead-based solder.

In spite of their promise, solders resulting from metal nanoparticle-based materials do not allow for easy rework to take place when replacement of failed components becomes necessary. Specifically, once metal nanoparticles have become at least partially fused together in a solder to form larger particles, they begin to lose their nanoparticle characteristics and exhibit properties more like those of the bulk metal. Thus, whereas initial processing is facile using metal nanoparticle-based solder materials, rework can become very problematic due to the much higher processing temperatures needed once partial to complete fusion of the metal nanoparticles takes place. This can make replacement of failed components nearly impossible in some cases. Although a number of approaches have been pursued to improve rework of metal nanoparticle-based solder materials, there has yet to be a satisfactory resolution to this issue.

In view of the foregoing, improved methods for rework of solders, particularly those derived from metal nanoparticles, are needed. The present invention satisfies this need and provides related advantages as well.

SUMMARY

In various embodiments, methods for replacing one or more joined members by reworking a solder are described herein. In some embodiments, the methods include applying a disintegrating agent to a solder containing a solder material, disintegrating the solder material to form a disintegrated solder material, and removing the disintegrated solder material from the solder.

In some embodiments, methods for reworking a solder containing one or more joined members include applying a disintegrating agent that contains bismuth to a solder containing a solder material, and heating the solder to liquefy the disintegrating agent.

In some embodiments, methods for reworking a solder containing one or more joined members include applying a disintegrating agent that contains a bismuth alloy to a solder having a solder material that contains metal nanoparticles, and heating the solder to liquefy the bismuth alloy.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing a specific embodiments of the disclosure, wherein.

DETAILED DESCRIPTION

Figure 1:
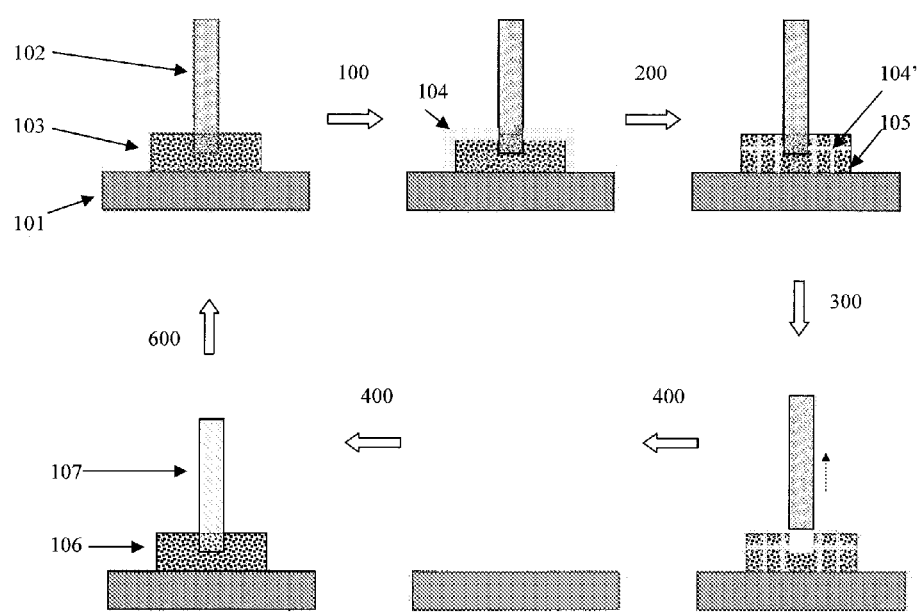
FIG. 1 shows a schematic of an illustrative process through which a solder can be reworked multiple times using the present methods.

The present disclosure is directed to methods for reworking a solder (e.g., a solder joint), particularly a solder derived from at least partial fusion of metal nanoparticles. More particularly, the present disclosure is directed to methods for reworking a solder containing copper, including solders containing bulk copper, micron size copper grains and/or copper nanoparticles that are at least partially fused together. The present methods are especially advantageous for rework of a solder containing a lead-free solder material.

Metal nanoparticles have shown considerable promise in soldering applications, particularly during initial processing. For example, solder materials containing copper nanoparticles of less than about 10 nm in size can exhibit a fusion temperature of less than about 200° C., which is comparable to that of traditional lead-based solder materials. However, such metal nanoparticle-based solder materials present several problematic issues at the rework stage. Specifically, as the metal nanoparticles become at least partially fused together during initial processing, they begin to lose their nanoparticle character, and their melting point rapidly rises with increasing particle size. Accordingly, a member that was easily joined to the solder during initial processing can become much more problematic to remove at the rework stage due to the considerably higher temperatures needed to liquefy the solder material again. Although several approaches have sought to improve the rework properties of solder materials derived from metal nanoparticle-based systems, none have satisfactorily achieved the simple rework behavior of traditional lead-based solder materials.

In the present embodiments, simple methods for reworking a metal-containing solder are described. The present methods are generally applicable to rework of any type of metal-containing solder material, particularly a solder material containing at least some copper (e.g. about 5% or greater copper by weight). More particularly, the present methods can be suitable for rework of a solder derived from a metal nanoparticle-based solder material, including copper nanoparticle-based solder materials. Specifically, the present methods take advantage of liquid metal embrittlement to disintegrate the solder material, thereby allowing rework of the solder to take place.

Liquid metal embrittlement is generally an undesirable phenomenon in which certain metal substrates can experience a drastic loss in tensile ductility and/or undergo brittle fracture when exposed to certain liquid metals. While generally an undesirable process, it has surprisingly been discovered that liquid metal embrittlement can be used to facilitate rework of a solder. Specifically, it has been discovered that a solder material in a solder, particularly those containing at least some copper, can be rapidly infiltrated with a disintegrating agent along grain boundaries to facilitate the rapid disintegration thereof through liquid metal embrittlement. This can be especially true for solders derived from metal nanoparticle-based solder materials, particularly copper nanoparticles that have been partially or completely fused together. Upon exposure to a liquid metal, one or more joined members in a solder can be easily disconnected, thereby allowing rework to take place. For metals or metal alloys that form a liquid metal at sufficiently low temperatures, rework of the solder can take place at temperatures that are at or below those used for traditional lead-based solder materials or lead-free solder materials that are being used as replacements for lead-based solder materials.

Without being bound by theory or mechanism, it is believed that exposure of a solder, particularly a solder derived from partially or fully fused metal nanoparticles, to a liquid metal results in movement of the liquid metal along the grain boundaries in the solder material, thereby pushing the solder material apart from itself. The solder material thereafter becomes very weak and basically falls apart within a few minutes following treatment with the liquid metal. A failed component can thereafter be removed along with the old solder material, and a replacement component can be joined to the solder joint by application of a replacement solder material. By applying the present methods, it is possible to rework a solder multiple times. This feature mirrors that of most lead-based solder materials, where multiple rework operations can be conducted. In contrast, many lead-free solder materials, including those containing metal nanoparticles, often offer limited rework potential and require extended heating times and higher temperatures (e.g., 250° C.-300° C.) during rework due to limited wettability, thereby exposing potentially temperature-sensitive components to thermal damage. Hence, the present methods are particularly applicable to solders containing temperature-sensitive components (e.g., electronics materials such as printed circuit boards). It is to be recognized that any solder containing a metal that can be embrittled with a disintegrating agent can be reworked according to the present methods, not just those derived from metal nanoparticle-based solder materials.

A further advantage of the present methods is that only very small quantities of the disintegrating agent are generally needed to embrittle a solder to allow rework to occur. As the disintegrating agent acts upon the solder, cracks and other defects are created in the solder material, which can propagate by application of strain, for example. Upon crack and defect propagation, the disintegrating agent can further progress into the solder via capillary action to facilitate removal of a member attached thereto.

As used herein, the terms "solder" or "soldering" refer to the process of joining one or more members together with a solder material. The term "solder" also refers to the union (e.g., a solder joint) between one or more members joined together with a solder material. As used herein, the term "solder material" refers to a fusible metal composition that is used to join one or more members to one another.

As used herein, the terms "disintegrate" or "disintegrating" refer to breaking apart.

As used herein, the terms "fuse," "fused" or "fusion" refer to a coalescence or partial coalescence between two or more nanoparticles.

As used herein, the term "fusion temperature" refers to the temperature at which a nanoparticle liquefies, giving the appearance of melting.

As used herein, the term "nanoparticles" refers to particles having a size of less than about 100 nm in equivalent spherical diameter, although nanoparticles need not necessarily be spherical in shape.

As used herein, the term "size range" refers to the distribution of nanoparticle sizes in a plurality of nanoparticles, such that >50% of the nanoparticles have a size residing within the indicated size range.

As used herein, the term "average size" refers to the arithmetic mean of the distribution of nanoparticle sizes in a plurality of nanoparticles.

As used herein, the term "maximum size" refers to the largest nanoparticle size observed in a plurality of nanoparticles.

As used herein, the term "organic solvent" generally refers to polar aprotic organic solvents. Useful organic solvents of the embodiments described herein are capable of solubilizing copper salts and reducing agents or acting as co-solvents to solubilize copper salts and reducing agents.

In various embodiments, methods for reworking a solder containing one or more joined members are described herein. In some embodiments, the methods include applying a disintegrating agent to a solder containing a solder material, disintegrating the solder material to form a disintegrated solder material, and removing the disintegrated solder material from the solder. In some embodiments, the methods further include adding a replacement solder material to the solder so as to join a replacement member thereto.

In some embodiments, the disintegrating agent is a liquid metal or liquid metal alloy, such that disintegration occurs through liquid metal embrittlement. In some embodiments, the disintegrating agent is applied to the solder already in its liquid state. That is, in such embodiments, a molten metal or molten metal alloy is applied directly to the solder. In other embodiments, the disintegrating agent is applied to the solder in a non-liquid state that is liquefied following application to the solder. That is, in such embodiments, a metal or metal alloy can be applied to the solder while still in its solid state and liquefied thereafter. In such embodiments, the disintegrating agent can be in non-limiting forms including, for example, granules, powders, wire and the like. As described further below, the disintegrating agent, whether in the solid or liquid state, can be mixed with various inert components in order to facilitate its application to the solder.

In some embodiments, the present methods can further include heating the solder. In such embodiments, heating can take place before, concurrently with, or after application of the disintegrating agent to the solder. In some embodiments, the present methods can involve heating the solder to liquefy the disintegrating agent. Heating can be applied over the whole solder or locally over any of its components. Heating can be conducted through any means known to those of ordinary skill in the art including, for example, a solder iron, a laser, a heating tape, a heat gun, an oven, a hot plate, vapor phase heating and the like. Advantages of vapor phase heating include, for example, superior thermal performance, minimal temperature variation across the solder and low power consumption. In addition, vapor phase heating offers the opportunity for inert atmosphere soldering with or without supplying an inert gas such as nitrogen and the opportunity for soldering under vacuum to produce a substantially void-free solder.

In some embodiments, the disintegrating agent can be in a form that is easily applied to the solder. In some embodiments, the disintegrating agent can be in non-limiting forms including, for example, a paste, a gel, a foam, a powder, wire, chips, granules, and the like. In some embodiments, a solid or liquid metal disintegrating agent can be formulated into a paste, a gel or a foam and then applied to the solder. Generally, the paste, gel or foam contains various inert binders or fillers so as to achieve the paste, gel or foam state, where the disintegrating agent is incorporated therein. Once applied to the solder, the disintegrating agent can be activated (e.g., melting of a solid metal) and released from the inert binders or fillers. Generally, the disintegrating agent is in a form such as, for example, powders, granules, chips, shavings, and the like so as to be readily dispersible in the paste, gel or foam. Optionally, the disintegrating agent can be alloyed with one or more metals or include a surfactant.

In various embodiments, the disintegrating agent contains bismuth, particularly metallic bismuth. Bismuth is particularly advantageous for achieving low temperature rework of a solder using a liquid metal, since it has a low melting point of 272° C. and is particularly effective at moving along grain boundaries of metals, especially copper. Other sources of bismuth can be used equivalently including, for example, bismuth alloys and organometallic bismuth compounds, particularly those that can be decomposed to yield metallic bismuth. Other liquid metal disintegrating agents that can be used in the present methods include, for example, gallium, cadmium, indium, tin, zinc, lithium, mercury, and lead, but many of these have higher melting points and/or toxicity or cost concerns and are less preferred.

To achieve even lower rework temperatures, bismuth alloys can be used as the disintegrating agent in various embodiments, since they can have even lower melting points than metallic bismuth. Such bismuth alloys can contain from about 1% bismuth to about 99% bismuth. In various embodiments, the composition of the bismuth alloy can be altered to attain a desired melting point of the disintegrating agent. Bismuth alloys that are eutectic in nature are generally preferred, but non-eutectic bismuth alloys can also be used in the present embodiments. Further, it has been unexpectedly found that the bismuth alloy composition can influence not just its melting point, but the rate at which the solder material disintegrates and the distance that the disintegrating agent penetrates into the solder. In some embodiments, an amount of bismuth in the bismuth alloy determines a distance that the disintegrating agent penetrates into the solder. In some embodiments, an amount of bismuth in the bismuth alloy determines a rate at which the solder material disintegrates. In general, higher amounts of bismuth in the bismuth alloy can result in a greater degree of embrittlement of the solder material than when smaller amounts of bismuth are used.

In general, bismuth alloys that have a melting point below about 200° C. are preferred, since they allow rework to take place at temperatures comparable to those of traditional lead-based solder materials. However, any bismuth alloy, regardless of its composition or melting point, can be used in the present embodiments. A number of bismuth alloys having a melting point below about 200° C. are known in the art. In some embodiments, bismuth alloys containing bismuth and tin, bismuth and indium, or bismuth and gallium can be used in the present methods. In some embodiments, bismuth alloys containing bismuth and tin can further contain elements including, for example, gallium, indium, and combinations thereof. Each of these additional elements can further lower the melting point of the bismuth alloy. In some embodiments, bismuth-indium-tin alloys having the following compositions can be used in the present methods (melting points in parentheses following composition): 57.2% Bi 24.8% In 18% Sn (m.p. 77° C.) or 32.5% Bi 51% In 16.5% Sn (m.p. 144° C.). In some embodiments, bismuth alloys having the following compositions can be used in the present methods: 58% Bi 42% Sn (m.p.=138° C.), 70% Bi 30% Ga (m.p. 180° C.), or 70% Bi 30% In (m.p. 180° C.). The foregoing bismuth alloy compositions have been provided for illustration purposes only and should not be considered limiting. Other bismuth alloys such as those containing lead, cadmium and/or mercury also have low melting points and can be used in the present methods, but they are not preferred due to toxicity concerns.

In some embodiments, an amount of tensile strain applied to the solder can determine a rate at which the solder material disintegrates. In the present embodiments, disintegration rates generally range from about 10 mm/s to about 100 mm/s, even in the absence of tensile strain.

In some embodiments, the present methods further include disconnecting the one or more joined members, after disintegration of the solder material. In some embodiments, the present methods further include removing the disintegrated solder material from the solder. In some embodiments, the present methods further include adding a replacement solder material to the solder so as to join a replacement member thereto. For example, in an embodiment, a failed component in a solder of an electronics assembly can be disassembled according to the present methods. The solder can thereafter be cleaned by removing the disintegrated solder material using mechanical methods such as, for example, brushing, abrading, sanding, sandblasting and the like, and a replacement component can be reconnected to the solder of the electronics assembly using a replacement solder material and known soldering techniques. The replacement solder material can be the same as or different than that originally disintegrated. Provided that the replacement solder material can be embrittled with a disintegrating agent, the present methods allow multiple rework operations to be conducted.

As a non-limiting example of the present methods, a solder can be reworked according to the following procedures. First, the area around the solder can be masked with a material such as photoresist, aluminum foil or tape such that substantially only the area to be reworked is exposed. Optional removal of an oxide layer coating the solder material can be conducted by treatment with an acid such as, for example, formic acid, acetic acid, malic acid, citric acid, ascorbic acid or mineral acids. Next, a disintegrating agent such as a bismuth alloy can be applied to the solder, followed by heating to melt the disintegrating agent. In general, care is taken to not greatly exceed the melting point of the disintegrating agent, as excessive temperatures will slow the rate of disintegration. While heating, a tensile strain can optionally be applied to the solder to increase the disintegration rate until the member to be removed becomes disconnected. Application of tensile strain can be applied with tweezers or a like instrument to apply force upon the member to be removed. After removing the member, the work area can be cleaned and abraded to remove the solder material. Vacuum cleaning can optionally be performed during the cleanup process. Finally, the work area can be cleaned with a solvent such as isopropyl alcohol before a replacement member and fresh solder material are applied.

In various embodiments, solder materials that can be disintegrated through utilization of the present methods vary over a wide range and include those containing, for example, copper, silver, gold, tin or aluminum. Each of these elements is capable of forming nanoparticles having a low fusion temperature that are suitable for use in soldering applications. In some embodiments, the solder can be derived from metal nanoparticles including those mentioned above, for example. However, in other embodiments, the solder can be derived directly from a bulk metal. In either case, the solder material can be embrittled by the disintegrating agent according to the present embodiments. In some embodiments, solder materials containing copper are particularly suited for being disintegrated by the present methods. In some embodiments, the copper can be in the form of copper nanoparticles. In some embodiments, the copper nanoparticles of the solder materials can further include at least one surfactant. Additional disclosure regarding the synthesis and properties of copper nanoparticles is set forth in further detail hereinbelow.

In some embodiments, methods for reworking a solder containing a solder material include providing a solder containing one or more joined members, applying a disintegrating agent to the solder, and disintegrating the solder material.

In some embodiments, methods for reworking a solder containing one or more joined members include applying a disintegrating agent containing bismuth to a solder containing a solder material, and heating the solder to liquefy the disintegrating agent. In such embodiments, the liquefied disintegrating agent penetrates the solder, thereby disintegrating the solder material and allowing rework of the solder to take place. In some embodiments, penetration of the solder and the solder material therein can take place by capillary action. In some embodiments, the penetration of the solder can be further aided by application of pressure.

In some embodiments, the methods further include disintegrating the solder material to form a disintegrated solder material. In some embodiments, the methods further include disconnecting the one or more joined members, removing the disintegrated solder material from the solder, and adding a replacement solder material to the solder so as to join a replacement member thereto.

In some embodiments, methods for reworking a solder containing one or more joined members include applying a disintegrating agent containing a bismuth alloy to a solder having a solder material that contains metal nanoparticles, and heating the solder to liquefy the disintegrating agent. In such embodiments, the liquefied bismuth alloy penetrates the solder, thereby disintegrating the solder material and allowing rework of the solder to take place. In some embodiments, while penetrating the solder, the liquefied bismuth alloy can penetrate grain boundaries between the metal nanoparticles to facilitate disintegration of the solder material.

In some embodiments, the metal nanoparticles include copper nanoparticles. In some embodiments, the copper nanoparticles are less than about 20 nm in size before being at least partially fused together to join the first member to the second member. In some embodiments, the copper nanoparticles are at least partially fused together in the solder. That is, in the solder, the copper nanoparticles have a melting point below that of the fusion temperature of the initial copper nanoparticles (e.g., less than about 200° C.) and that of bulk copper (m.p.=1083° C.).

FIG. 1 shows a schematic of an illustrative process through which a solder can be reworked multiple times using the present methods. FIG. 1 shows rework of a solder containing two joined members, but a solder containing any number of joined members can be reworked by application of the present methods. In operation 100, first member 101 and second member 102 joined by solder material 103 (e.g., copper nanoparticles) are treated with bismuth alloy 104. In operation 200, bismuth alloy 104 is melted such that it at least partially penetrates the solder and infiltrates into solder material 103, thereby causing its disintegration and forming disintegrated solder material 105, containing bismuth alloy 104' therein. At this point, second member 102 can be easily separated from first member 101 in operation 300. In operation 400, disintegrated solder material 105 and bismuth alloy 104' are removed from first member 101. Thereafter in operation 500, replacement solder material 106 and replacement member 107 can be placed on first member 101. Replacement solder material 106 can be flowed at this point to join replacement member 107 to first member 101 in operation 600. In the case of metal nanoparticles (e.g., copper nanoparticles), the metal nanoparticles become at least partially fused together at this point. The operations depicted in FIG. 1 can be repeated multiple times to allow for ongoing rework of the solder.

Figure 2A:
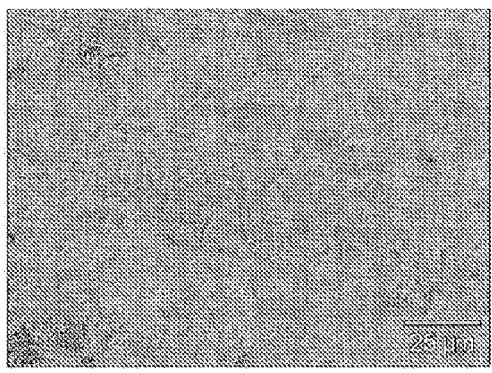
FIGS. 2A and 2B show illustrative SEM images of a copper foil before (FIG. 2A) and after (FIG. 2B) embrittlement with liquid bismuth.
Figure 2B:
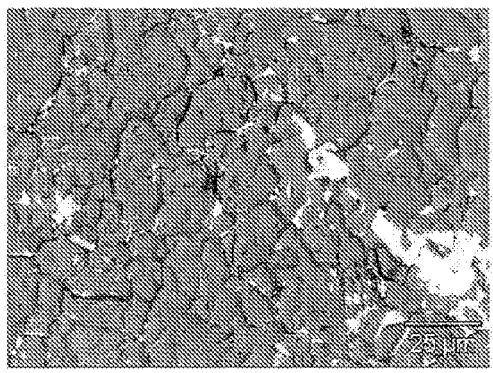
Figure 2C:
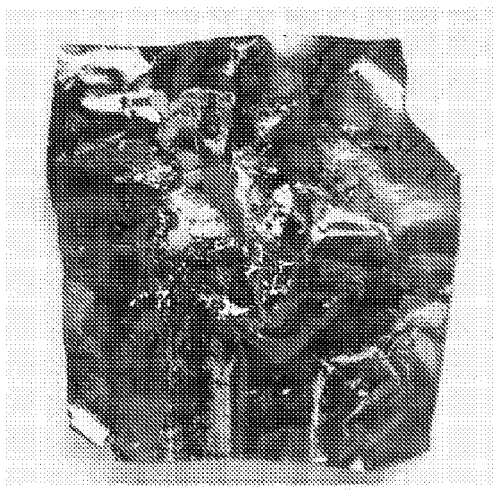
FIG. 2C shows an optical image of a copper foil after embrittlement with liquid bismuth.

FIGS. 2A and 2B show illustrative SEM images of a copper foil before (FIG. 2A) and after (FIG. 2B) embrittlement with liquid bismuth. FIG. 2B clearly shows separation and breakdown of the copper grain structure. FIG. 2C shows an optical image of a copper foil after embrittlement with liquid bismuth.

Although the above disclosure has been described with particular reference to copper nanoparticles in some embodiments, it is to be recognized that any solder containing a metal that can be embrittled by a disintegrating agent can be reworked according to the present methods. Further, it is to be recognized that the present methods are applicable not only to metal nanoparticle-derived solder materials, but also solder materials containing bulk metals (e.g., metals having a grain size of greater than about 100 μm) or micron size metals (e.g., metals having a grain size ranging between about 1 μm and about 100 μm).

Various methods for forming copper nanoparticles suitable for use in the present embodiments are now known. Illustrative methods for preparing nanoparticles are described in commonly owned, co-pending United States patent application Ser. Nos. 12/426,160, filed Apr. 17, 2009; 12/512,315, filed Jun. 30, 2009; and 12/813,463, filed Jun. 10, 2010, each of which is incorporated herein by reference in its entirety. These methods are set forth in brief hereinafter.

To prepare copper nanoparticles, one or more copper nanoparticle precursors (i.e., a copper salt) is added to a solvent. Illustrative copper salts suitable for forming copper nanoparticles include cuprous and cupric salts, for example, cuprous chloride (CuCl), cuprous oxide ($Cu_2O$), cuprous hydroxide (CuOH), cupric chloride ($CuCl_2$), cupric oxide (CuO) and cuprous hydroxide ($Cu(OH)_2$). Acids, bases, amines or ammonia can also be added, particularly in combination with the oxides or hydroxides, to promote solubility. Other suitable copper salts include, for example, other cuprous or cupric halides, nitrates, acetates, sulfates or formates. One of ordinary skill in the art will recognize the benefit of choosing a copper salt that has good solubility in the solvent being employed. Moreover, the choice of the copper salt can be a function of cost and scale. For example, inexpensive copper halide salts can be especially effective for large scale operations.

In some embodiments, the copper salt can be in a hydrated form such as, for example, a monohydrate, a dihydrate, a trihydrate, a tetrahydrate, and the like. In some embodiments, the copper salt can be dried before being used to form copper nanoparticles. In some embodiments, drying can be accomplished with heating and/or vacuum. In other embodiments, the water of hydration can be chemically removed by reaction with a drying agent such as, for example, an orthoester or thionyl chloride.

The copper salt is then mixed with a solvent such as, for example, an organic solvent. The organic solvent can be anhydrous in some embodiments. In some embodiments, the organic solvent is a polar aprotic organic solvent that is capable of at least partially solubilizing the copper salt and a reducing agent. Illustrative polar aprotic organic solvents include, for example, formamide, N,N-dimethylformamide, dimethyl sulfoxide, dimethylpropylene urea, hexamethylphosphoramide, tetrahydrofuran, dimethyl or diethyl ether of glyme, diglyme, triglyme or tetraglyme. Concentrations of the copper salt in the solvent typically range between about 0.1 M and about 0.5 M in some embodiments, or between about 0.1 M and about 0.25 M in other embodiments, or between about 0.1 M and about 0.15 M in still other embodiments.

After adding the copper salt to the organic solvent, at least one surfactant is then added. In some embodiments, a first surfactant is used in combination with a second surfactant. In some embodiments, a first surfactant, a second surfactant, and a third surfactant are used in combination with one another. Without being bound by theory or mechanism, it is believed that the surfactants help control the maximum size and size distribution range of the copper nanoparticles. Still without being bound by theory or mechanism, it is believed that the second surfactant and optional third surfactant can help control the properties of the copper nanoparticles after their synthesis. In some embodiments, the first surfactant can also possess this function. In some embodiments, the surfactants can be releasable from the copper nanoparticles upon heating so as to aid their fusion to one another in a solder. In particular, amine surfactants are particularly easily released from copper nanoparticles upon heating.

In some embodiments, the first surfactant can be at least one amine. In some embodiments, the second surfactant can be an amine, a multi-dentate amine, a phosphine and/or a sulfur-containing ligand. In some embodiments, the third surfactant can be an amine or multi-dentate amine.

In some embodiments, amine surfactants suitable for use as the first surfactant can have about 6 carbon atoms to about 20 carbon atoms (e.g., n-hexylamine, n-octylamine, and n-dodecylamine). Branched chain amines can also be used. In various embodiments, the amine surfactants can contain primary or secondary amines. In some embodiments, the amine surfactants can have significant steric bulk such as, for example, t-butyl amines (e.g., t-butyl amine and t-octylamine) and N,N'-disubstituted amines (e.g., N,N'-dimethylethylenediamine, N,N'-di-t-butylethylenediamine and N,N'-di-isopropylethylenediamine). The corresponding methylenediamine and propylenediamine derivatives can also be used. Without being bound by theory or mechanism, it is believed that in such embodiments, the steric bulk of the surfactant can beneficially impede growth of large particles and increase stability of the copper nanoparticles.

Other suitable first surfactants include, for example, pyridine, diethylenetriamine, phosphines (e.g., $PR_3$, where R is an alkyl or aryl group containing about 6 to about 16 carbon atoms), and sulfur-containing compounds (e.g., thiols: RSH, where R is an alkyl or aryl group containing about 4 to about 12 carbon atoms, and disulfides: RSR, where R is an alkyl or aryl group containing about 4 to about 10 carbon atoms). In some embodiments, suitable first surfactants can be polymeric such as, for example, polyvinylpyrrolidone (PVP). In some embodiments, PVP can be used at a concentration of about 0.1% to about 0.2% by weight.

In some embodiments, the second surfactant can include surfactants listed above that can be used for the first surfactant. In some embodiments, the second surfactant can include amines (e.g., n-butylamine, t-butylamine, hexylamine, octylamine, t-octylamine, dodecylamine, dihexylamine, dicyclohexylamine, tripentylamine, diethylenetriamine, N,N'-dimethylethylenediamine, and ethylenediamine), quaternary ammonium salts (e.g., tetramethylammonium bromide and tetraethylammonium bromide), phosphines and phosphine oxides (e.g., tributylphosphine, trioctylphosphine, triphenylphosphine and oxides thereof), and sulfur-containing ligands.

In other various embodiments, the second surfactant can be a chelating agent such as, for example, a bidentate amine. Illustrative bidentate amines include, for example, ethylenediamine and propylenediamine and various derivatives thereof including, for example, N,N'-dimethylethylenediamine, N,N'-diisopropylethylenediamine, and N,N'-di-t-butylethylenediamine. Other suitable chelating agents can include, for example, ethylenediaminetetraacetic acid and derivatives thereof and phosphonate ligands.

In some embodiments, surfactants can include an amine and at least one of a phosphine or a sulfur-containing compound. In some embodiments, surfactants can include an amine, a phosphine, and a sulfur-containing compound. In some embodiments, surfactants can include a primary aliphatic amine, a secondary aliphatic amine, a secondary diamine containing t-butyl groups, or a higher multi-dentate amine. Through optimization of the surfactants, nanoparticles of a desired size and uniform size distribution can be obtained. One of ordinary skill in the art will therefore recognize that the fusion temperature of the copper nanoparticles can be controlled through routine experimental variation of the first surfactant and the second surfactant.

In some embodiments, the overall stoichiometric ratio of the surfactants to copper can range between about 1:1 to about 2:1.

In some embodiments, a surfactant system containing a first surfactant of an amine having about 6 to about 20 carbon atoms and a second surfactant of a bidentate amine are operable to produce copper nanoparticles having an average size of about 10 nm or smaller under mild heating conditions (e.g., 30-80° C.) using inexpensive copper salts, reducing agents and solvents. As described herein, the size range of the copper nanoparticles can be tuned by adjusting, for example, the reaction temperature, the reagent concentrations, the reagent addition rates, and the order of reagent additions. For example, at lower temperatures (e.g., 30-50° C.) copper nanoparticles having an average size of about 5 nm or smaller can be produced.

In some embodiments, copper nanoparticles can be formed by adding a reducing agent to a solution containing a copper salt and at least one surfactant. Under such addition conditions, copper nanoparticles about 20 nm and under in size can be produced.

In alternative embodiments, a solution containing a copper salt and at least one surfactant can be added to a reducing agent in order to form copper nanoparticles. Under such addition conditions, copper nanoparticles about 10 nm and under in size can be produced, particularly when a bidentate amine second surfactant is used. Copper nanoparticles produced in accordance with these embodiments are particularly useful in the present soldering applications due to their low fusion temperatures. In embodiments in which the solution of copper salt and at least one surfactant is added to the reducing agent, the addition is generally conducted rapidly (e.g., less than about 5 minutes, or less than about 4 minutes, or less than about 3 minutes, or less than about 2 minutes or less than about 1 minutes in various embodiments).

A variety of reducing agents can reduce copper salts to metallic copper nanoparticles under the conditions described above. In some embodiments, the reducing agent can be an alkali metal such as, for example, lithium, sodium or potassium, in the presence of a suitable catalyst. In some embodiments, the reducing agent can be lithium naphthalide, sodium naphthalide, or potassium naphthalide. In other embodiments, the reducing agent can be sodium borohydride or a like hydride reducing agent. In some embodiments, the reducing agent can be ascorbic acid or citric acid.

After or during the addition of the reducing agent to the solution of the copper salt and at least one surfactant (or vice versa), the reaction mixture is monitored for signs of copper nanoparticle formation. These signs can include, for example, a change in color and/or gas evolution. Typically, the formation of copper nanoparticles is accompanied by the appearance of a black color in the reaction mixture as the copper nanoparticles become of sufficient size.

In some embodiments, the reducing agent is added in a slight stoichiometric excess of up to about 15%. In some embodiments, the amount of excess reducing agent is about 1-5%. In other embodiments, the amount of excess reducing agent is about 5-10% or about 10-15%. In various embodiments, borohydride reducing agents are added at about 10-15% molar excess. In various embodiments, naphthalide reducing agents are added at a 2-5% molar excess.

In some embodiments, after formation of copper nanoparticles of a desired size has taken place, the reaction can be stopped. In some embodiments, stopping the reaction can involve cooling the reaction mixture to slow down the reaction (e.g., in a dry ice bath) and separating the copper nanoparticles from the mother liquor.

In some embodiments, after formation of copper nanoparticles of a desired size has take place, an additional surfactant can be added. In some embodiments, the additional surfactant can be a multi-dentate surfactant. The additional surfactant can also terminate the reaction in some embodiments. In addition to the benefits noted above, the additional surfactant can also protect the copper nanoparticles from the reaction mixture and arrest their further growth. In addition, the additional surfactant can inhibit oxidation of the copper nanoparticles upon exposure to air. Optionally, the additional surfactant can be added while the copper nanoparticles are still growing, such that the additional surfactant slows down but does not stop their growth.

In some embodiments, the copper nanoparticles can be isolated for storage or use in another application. In some embodiments, the copper nanoparticles can be isolated by centrifugation, accompanied by optional washing steps, and transformed to a dry powder. For example, in some embodiments, the copper nanoparticles can be washed with a mixture of water and an organic solvent (e.g., hexane) to remove water soluble salts and residual organic byproducts remaining from the reaction mixture. In some embodiments, the copper nanoparticles can be isolated by lyophilizing the reaction mixture or another solution containing the copper nanoparticles. In other embodiments, the copper nanoparticles can be left in the reaction mixture in an unpurified state and used directly in further applications.

In some embodiments, the copper nanoparticles can be mixed with an inert matrix to affect stability during storage and, optionally, to facilitate their use in further applications. For example, the copper nanoparticles can optionally be mixed with a gelling or foaming agent at this stage to facilitate their use in the soldering applications described herein. As noted above, such formulations of the copper nanoparticles facilitate their application to a solder joint. In various embodiments, small amounts of solvents such as, for example, ethanol, isopropanol, acetone, toluene and the like can be added to these formulations to attain a desired consistency.

It is to be understood that modifications which do not substantially affect the activity of the various embodiments of this invention are also included within the definition of the invention provided herein. Accordingly, the following examples are intended to illustrate but not limit the present invention.

EXAMPLE 1

Removal of a Circuit Board Component Using a Bismuth/Gallium Alloy

The area around the component to be removed was masked to avoid any contamination with the disintegrating agent using a photoresist material or aluminum masking tape. To the solder was added 100-250 µL of a weak etchant (formic acid/acetic acid) to remove the surface oxide layer. A sufficient amount of bismuth alloy containing 70% Bi and 30% Ga was applied to the solder in a powder form that also contained a wetting agent. The bismuth alloy was then heated to 5-10° C. above its melting point of 180° C. so that it all melted, at which point the bismuth rapidly embrittled the solder. Mechanical stress was applied using a tweezers to speed up the embrittlement process. After 15 seconds to 2 minutes above the melting point, the component was removable and heating was discontinued. Thereafter, the treated area was mechanically cleaned using a steel brush, residual solids were removed by vacuum, and washing with isopropyl alcohol was conducted. Subsequently, the photoresist or aluminum tape was removed, and a new component was connected.

EXAMPLE 2

Removal of a Circuit Board Component Using a Bismuth/Indium Alloy

Removal of the solder component was conducted as described above for EXAMPLE 1, except a 70% bismuth 30% indium alloy (m.p.=180° C.) was used. Substantially identical results were obtained.

Although the invention has been described with reference to the disclosed embodiments, those of ordinary skill in the art will readily appreciate that these embodiments are only illustrative of the invention. It should be understood that various modifications can be made without departing from the spirit of the invention. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is the following:

1. A method for replacing one or more joined members by reworking a solder, the method comprising:
    applying a disintegrating agent to a solder comprising a solder material;
        wherein the disintegrating agent comprises bismuth;
    disintegrating the solder material to form a disintegrated solder material; and
    removing the disintegrated solder material from the solder.

2. The method of claim 1, further comprising:
    adding a replacement solder material to the solder so as to join a replacement member thereto.

3. The method of claim 1, wherein the disintegrating agent comprises liquid bismuth or a liquid bismuth alloy.

4. The method of claim 1, wherein the disintegrating agent comprises bismuth or a bismuth alloy that is liquefied following application to the solder.

5. The method of claim 4, further comprising:
    heating the solder.

6. The method of claim 1, wherein the disintegrating agent comprises a paste, a foam, a gel, granules, a wire, or a powder.

7. The method of claim 1, wherein the disintegrating agent comprises a bismuth alloy.

8. The method of claim 1, wherein the solder material comprises at least one metal selected from the group consisting of copper, silver, gold and aluminum.

9. The method of claim 1, wherein the solder material comprises copper.

10. The method of claim 9, wherein the solder material comprises copper nanoparticles.

11. The method of claim 9, wherein the disintegrating agent comprises a bismuth alloy.

12. The method of claim 11, wherein the bismuth alloy comprises bismuth and tin.

13. The method of claim 12, wherein the bismuth alloy further comprises gallium, indium, or combinations thereof.

14. A method for reworking a solder comprising one or more joined members, the method comprising:
    applying a disintegrating agent to a solder comprising a solder material;
        wherein the disintegrating agent comprises bismuth;
    heating the solder to liquefy the disintegrating agent; and
    disintegrating the solder material to form a disintegrated solder material.

15. The method of claim 14, further comprising:
    disconnecting the one or more joined members;
    removing the disintegrated solder material from the solder; and
    adding a replacement solder material to the solder so as to join a replacement member thereto.

16. The method of claim 14, wherein the solder material comprises copper.

17. The method of claim 16, wherein the disintegrating agent comprises a bismuth alloy.

18. The method of claim 17, wherein the bismuth alloy has a melting point of less than about 200° C.

19. The method of claim 17, wherein the bismuth alloy comprises bismuth and tin.

20. The method of claim 19, wherein the bismuth alloy further comprises gallium, indium, or combinations thereof.

21. The method of claim 14, wherein the disintegrating agent comprises a paste, a foam, a gel, granules, a wire, or a powder.

22. A method for reworking a solder comprising one or more joined members, the method comprising:
    applying a disintegrating agent to a solder comprising a solder material;
        wherein the solder material comprises metal nanoparticles; and
        wherein the disintegrating agent comprises a bismuth alloy;
    heating the solder to liquefy the bismuth alloy; and
    disintegrating the solder material to form a disintegrated solder material.

23. The method of claim 22, wherein the liquefied bismuth alloy penetrates grain boundaries between the metal nanoparticles.

24. The method of claim 22, further comprising:
    disconnecting the one or more joined members;
    removing the disintegrated solder material from the solder; and adding a replacement solder material to the solder so as to join a replacement member thereto.

25. The method of claim 22, wherein an amount of bismuth in the bismuth alloy determines a distance that the disintegrating agent penetrates into the solder.

26. The method of claim 22, wherein an amount of bismuth in the bismuth alloy determines a rate at which the solder material disintegrates in the presence of the liquefied disintegrating agent.

27. The method of claim 22, wherein the metal nanoparticles comprise copper nanoparticles.

28. The method of claim 27, wherein the copper nanoparticles are at least partially fused together in the solder.

29. The method of claim 22, wherein the bismuth alloy has a melting point of less than about 200° C.

30. The method of claim 22, wherein the disintegrating agent comprises a paste, a foam, a gel, granules, a wire, or a powder.

31. The method of claim 22, wherein the bismuth alloy comprises bismuth and tin.

32. The method of claim 31, wherein the bismuth alloy further comprises gallium, indium or combinations thereof.

* * * * *